Nov. 9, 1926.  
T. W. WITTY  
BRAKE  
Filed June 5, 1926
1,606,681
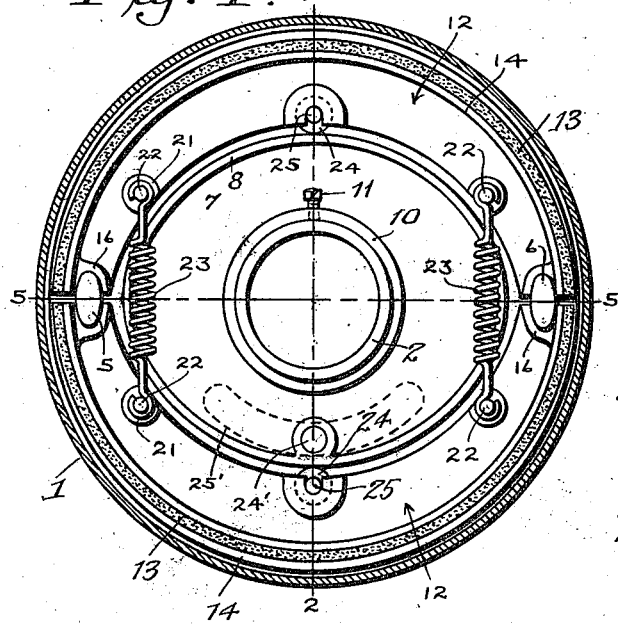
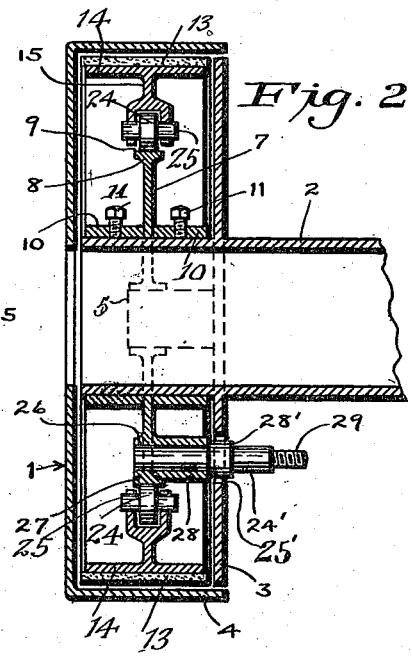
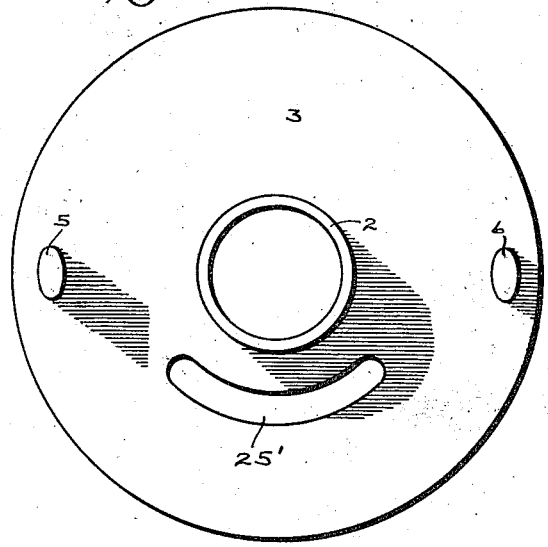
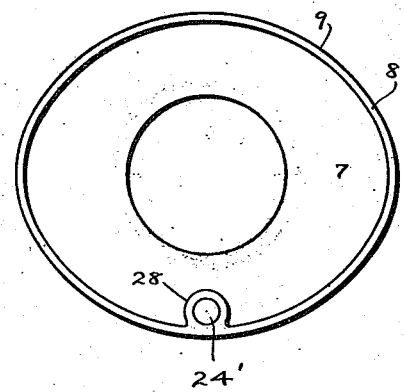
INVENTOR.
Thomas W. Witty
BY
ATTORNEY.

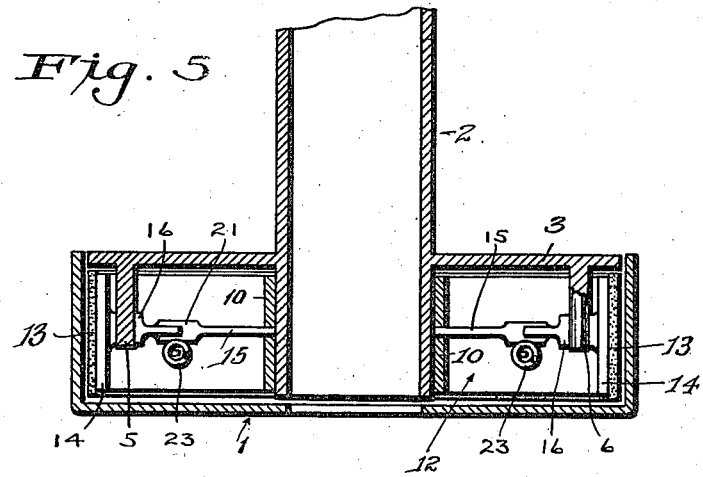
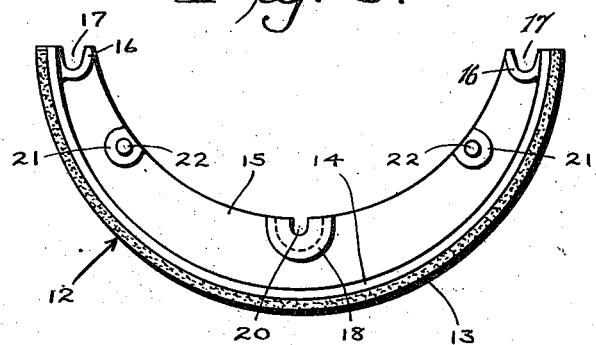
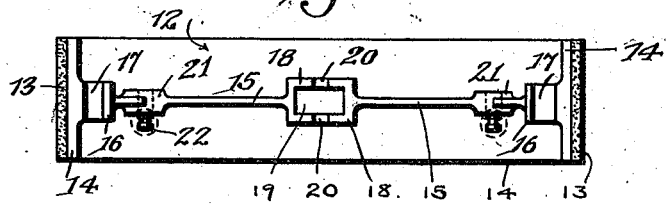

Patented Nov. 9, 1926.

1,606,681

UNITED STATES PATENT OFFICE.

THOMAS W. WITTY, OF LUVERNE, MINNESOTA.

BRAKE.

Application filed June 5, 1926. Serial No. 113,992.

This invention relates to a friction brake mechanism designed primarily for use in connection with the running gear of motor vehicles, but it is to be understood that a friction brake mechanism, in accordance with this invention, can be employed for any purposes for which it is found applicable, and the invention has for its object to provide, in a manner as hereinafter set forth, a brake mechanism including a pair of oppositely disposed brake shoes for frictional engagement with a brake drum and with the shoes so constructed and arranged whereby on the application of pressure thereto it will be distributed evenly throughout the length thereof and under such conditions provide for even wearing of the linings for the shoes thereby obtaining a much larger braking area resulting in a more effective and longer wearing brake mechanism.

Further objects of the invention are to provide, in a manner as hereinafter set forth, a friction brake mechanism for use in connection with the running gear of motor vehicles and which is simple in its construction and arrangement, strong, durable, compact, thoroughly efficient in its use, conveniently operated, readily installed with respect to a brake drum, and comparatively inexpensive to set up.

With the foregoing and other objects in view, the invention consists in the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation of a friction brake mechanism, in accordance with this invention, and showing the adaptation thereof in connection with a brake drum.

Figure 2 is a section on line 2—2 Figure 1.

Figure 3 is an end elevation of an axle section housing carrying a holder plate for the brake shoes.

Figure 4 is an elevation of the shifting member for the brake shoe.

Figure 5 is a section on line 5—5 Figure 1.

Figure 6 is an elevation of one of the brake shoes.

Figure 7 is a top plan view of one of the brake shoes.

Referring to the drawings in detail 1 denotes a brake drum which is adapted to be connected to a vehicle wheel, not shown, or to any other suitable support. Extending into the drum 1 is a stationary housing 2 of a shiftable or revoluble axle section or shaft. The axle section or shaft is not shown. The housing 2 at a point removed from its outer end is formed with an annular flange 3 of appropriate diameter and which opposes and is spaced from the inner wall of the drum 1. The flange 3 is slightly less in diameter than the inner diameter of the body portion 4 of the drum 1. The body portion 4 of the drum 1 overhangs the edge of the flange 3, see Figure 2. The flange 3 is termed a carrier and has its outer face formed with a pair of diametrically opposed pins or supports 5, 6 of oval shape in vertical section. The pin 5, as well as the pin 6, is of a length substantially half the width of the body portion 4 of the drum and as the carrier 3 is positioned within the body portion 4 the pin will project forwardly with respect to the vertical median of the body 4 in cross section, see Figure 5. The carrier is circular in contour, as well as the body portion 4 of the drum 1. When the carrier is mounted in opposed relation with respect to the inner wall of the drum 1, the rear face of the carrier is flush with the rear edge of the body portion 4 of the drum, see Figure 2.

Shiftably mounted upon the housing 2 and within the body portion 4 of the drum is a brake shoe actuating member 7 of elliptical contour and which is constructed of an elliptical shaped plate formed with a centrally disposed circular opening. The outer portion of the member 7 is enlarged as at 8 to provide for the outer edge of the member to be of greater width than the inner edge thereof. The said outer edge is indicated at 9. The member 7 is of a size with respect to the diameter of the body portion 4 of the drum as to have its outer edge spaced an appropriate distance from the inner face of said body portion. The member 7 is prevented from shifting lengthwise with respect to the housing 2 by a pair of spaced holding or retaining collars 10 which are mounted upon and fixedly secured to the axle housing 2 by set screws 11. The inner portion of the member 7 is confined between the opposed edges of the collars 10, but the collars 10 do not bind said member 7 to prevent the shifting therefrom to actuate the brake shoes, to be presently referred to.

Arranged to surround the member 7, as well as being spaced an appropriate distance therefrom, is a pair of oppositely disposed semi-circular brake shoes 12 each provided throughout with a lining 13 of appropriate thickness. Each brake shoe is in the form of a body portion of T-shaped cross section. The head of the body portion is indicated at 14 and the shank at 15. The head 14 opposes the inner face of the body portion 4 of the drum 1 and in cross section is of less length than the length of said body portion 4 in cross section. The shank or web 15 extends from one end to the other end of the body portion 14 and at each end of the shank or web 15 it is formed with a semi-oval shaped enlargement 16 to provide a pocket 17. The shank or web 15 gradually decreases in width from the vertical median of the brake shoe towards each end thereof, see Figure 6. The shank or web 15, centrally of its inner edge, is formed with an enlargement 18, hollowed to form a pocket 19 and with each side wall of said pocket formed with a semi-oval shaped notch 20. The notches of each enlargement 18 aline with each other. The function of the pocket 19 and notches 20 will be presently referred to.

One side of the shank or web 15, at a point between the enlargement 18 and each pocket 17 is provided with an offset portion 21 formed with a lateral pin 22. The pins 22 formed on one brake shoe aline with the pins 22 formed on the other brake shoe and each pair of alining pins are connected together by a controlling spring 23. Arranged in each pocket 19 as well as extending therefrom is a bearing roller 24 provided with pintles 25 which extend into the pair of alining notches 20. The controlling springs 23 maintain the rollers 24 against the outer edge 9 of the member 7.

Fixedly secured to the member 7 and projecting laterally therefrom is an arm 24' which extends through an arcuate slot 25' formed in the carrier 3 and said arm 24' is adapted to have its outer end attached to the control rod leading to the brake lever of the vehicle. The control rod is not shown. The member 7 is formed with an opening 26 in which is secured the arm 24' and said member 7 is furthermore provided with a boss 27 and a sleeve 28 in which the arm 24' is secured. The arm 24' is provided with an enlargement 28' which abuts against the free edge of the sleeve 28. The outer end of the arm 24' is constructed, as indicated at 29, in a manner for securing it to the control rod leading to the brake lever.

The pockets 17 formed in the ends of one brake shoe aline with the pockets 17 formed in the ends of the other brake shoe and extending through each pair of alining pockets is a pin or support 5 or 6. The pins 5 and 6 maintain the brake shoes in spaced relation with respect to each other and further arrest movement of the brake shoes toward each other, due to the action of the controlling springs 23.

When the member 7 is shifted or revolved on the axle section 2 through the medium of the control rod leading to the brake lever, the said member at its outer edge rides against the rollers 24 and will shift the brake shoes away from each other causing these latter to frictionally engage the inner face of the body portion 4 of the drum 1 thereby setting up a braking action. The shape of the member 7 is such, that in connection with the rollers 24 the brake shoes will move uniformly in opposite directions with respect to each other so that the linings will evenly engage the body portion of the drum or whereby on the application of pressure to the brake shoes it will be distributed evenly throughout the length thereof and under such conditions provide for even wearing of the lining for the shoes thereby obtaining a much larger braking area resulting in a more effective action. When the control rod is released, the member 7 will be returned to normal position, which is as shown in Figure 1. This action is provided for in view of the fact that the brake lever is spring released. The brake shoes are returned to normal position, that is to the position shown in Figure 1, through the action of their controlling springs 23 or in other words the brake shoes are spring released. The brake shoes automatically return to inactive position when the shifting member 7 is returned to normal position.

It is thought the many advantages of a friction brake mechanism, in accordance with this invention for the purpose referred to, can be readily understood, and although the preferred embodiment of the invention is as illustrated and described, yet it is to be understood that changes in the details of construction can be had which will fall within the scope of the invention as claimed.

What I claim is:

1. A friction brake mechanism comprising a pair of oppositely disposed spring released brake shoes shifting to active position on the application of pressure thereto, a revoluble shifting member in the form of an elliptical plate surrounded by said shoes and acting when shifted in one direction, to move said shoes in opposite directions relatively to each other to active position, said shoes provided at their inner edges with rollers travelling against the outer edge of said plate when the latter is shifted, a pair of stop elements normally extending through the ends of said shoes and acting as supports therefor and stops for arresting the movement of said shoes towards each other, a support for said stop elements, and means carried by said plate and extending through said support for connecting the plate to an actuating means therefor, said support formed with an arcuate slot coacting with said means.

2. A friction brake mechanism comprising a pair of oppositely disposed spring released brake shoes shifted to active position on the application of pressure thereto, a pair of controlling springs common to said shoes and connected therewith, rollers extended from the inner edge of said shoes, a revoluble shifting member of elliptical contour surrounded by said shoes and engaging said rollers to move the shoes to applied position when said member is shifted in one direction, means extending through the ends of said shoes for arresting the return movement thereof and further for supporting the shoes, a support for said means, said support formed with an arcuate slot, and means carried by said member and extending through said slot for connecting the member to an actuating means therefor.

In testimony whereof, I affix my signature hereto.

THOMAS W. WITTY.